April 8, 1969 A. W. LOHMANN 3,437,824
OPTICAL CHARACTER RECOGNITION
Filed Oct. 16, 1964 Sheet 1 of 2

INVENTOR.
ADOLF W. LOHMANN
BY Elmer Galbraith
ATTORNEY 3,437,824

OPTICAL CHARACTER RECOGNITION

Adolf W. Lohmann, San Jose, Calif., assignor to International Business Machines Corporation, New York, N.Y., a corporation of New York Filed Oct. 16, 1964, Ser. No. 404,399
Int. Cl. G02b 5/18; G06k 9/08; G01n 21/22
U.S. Cl. 250—219 8 Claims The present invention relates to optical systems and more particularly to an optical system for character recognition.

It is known that optical means for forming diffraction patterns, hereafter referred to as diffractometers, are useful for character recognition. For example, in one system which is shown in the prior art, a diffractometer is used to generate a diffraction pattern of the unknown character and the diffraction pattern of the unknown character is projected on a plurality of masks which have various possible diffraction patterns recorded thereon in the form of varying transmissivity. The mask which transmits the largest amount of light indicates that there is an autocorrelation between the diffraction pattern created by the unknown character and the diffraction pattern recorded on the particular mask. This system has the advantage that the recognition is invariant relative to changes in position of the unknown character since a diffraction pattern does not move when the character which is generating the pattern moves. One of the disadvantages of the above described system is that the masks used for correlation must include gray tones if satisfactory recognition is to be achieved. That is, the pattern on the various masks must include areas with various degrees of transmissivity rather than being simple two valued masks. Such a system is described in a paper by L. Horwitz and G. Shelton which is published in the Proceedings of the IRE, volume 49, page 175 (1961).

The prior art shows other character recognition systems which use diffractometers to generate a diffraction pattern of the unknown character. In some of the prior art systems, this diffraction pattern is used as a source or object for a second lens system which performs a Fourier transformation on the light from the first diffractometer. The transformed diffraction pattern (which is in essence the image of the actual character itself) is correlated with a series of masks. This type of system has the disadvantage that the output is not invariant relative to shifts in the unknown character. However, this type of system does have the advantage that the masks which are used for correlation only need contain totally transparent and totally opaque areas; that is, there is no need for any gray tones in the masks.

The present invention provides a system which combines the advantages of both of the types of systems described above. That is, the present invention provides an optical character recognition system which is shift invariant (i.e., invariant relative to shifts in position of the character being recognized) and which utilizes masks which have no gray tones.

The present invention achieves these results by a technique which is fundamentally different than that used in the prior art. The present invention is, therefore, not merely a modification of the systems shown in the prior art. The present invention involves an entirely new concept not heretofore recognized.

An object of the present invention is to provide an improved character recognition system.

A further object of the present invention is to provide an improved character recognition system which can utilize masks having no gray tones.

Another object of the present invention is to provide an improved character recognition system which is shift invariant.

Yet another object of the present invention is to provide a character recognition system which is shift invariant and which does not need masks having gray tones.

The system of the present invention includes first and second optical means for forming diffraction patterns, or first and second diffractometers, positioned along an optical axis. A phase randomizing device is positioned between the two diffractometers to randomize the phase of the light passing from the first diffractometer to the second diffractometer. The first diffractometer is used to generate a diffraction pattern of a first character. The second diffractometer is used to generate a diffraction pattern of a second character; however, since the entire diffraction pattern of the first character serves as a light source for the second diffractometer, the second diffractometer generates an overall pattern which consists of a plurality of superimposed diffraction patterns of the second character. By examining the intensity of the light at the center of these superimposed diffraction patterns, one can detect whether the overall pattern represents the autocorrelation or the cross correlation of the first and second character. That is, one can detect whether the first and second characters are the same or whether they are different.

The foregoing and other objects, features and advantages of the invention will be apparent from the following more particular description of preferred embodiments of the invention, as illustrated in the accompanying drawings.

Figure 1:
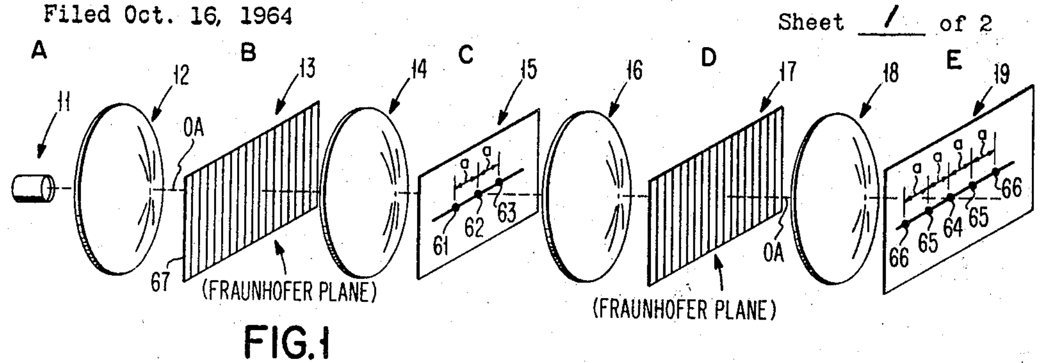
FIGURE 1 shows a first embodiment of the present invention being used to generate an autocorrelation pattern.

The first embodiment of the present invention (shown in FIGURES 1 and 2) includes a plurality of elements positioned along an optical axis OA. For ease of reference between the drawings and the specifications, five reference planes which are perpendicular to the optical axis are identified on the drawings by the letters A, B, C, D and E. These planes will be used to identify the location of various components in the system.

As will be seen in detail later, the components to the right of plane C form a first diffractometer and the elements to the left of plane C form a second diffractometer. Planes C and E are respectively the Fraunhofer planes for the first and second diffractometers. A first photographic film 13 with a character thereon is positioned in plane B, a second photographic film 17 with a character thereon is placed in plane D and a screen 19 is positioned in plane E. The image which appears on screen 19 indicates whether or not the characters on films 13 and 17 are identical. As will be seen later, the size and location of the indication in plane E does not depend upon where the character on films 13 and 17 are located in planes B and D. (Of course, films 13 and 17 must be within the optical system.)

The first diffractometer (to the left of plane C) is formed by a monochromatic point source of light 11, collimating lens 12 and condensing lens 14. The second diffractometer is formed by collimating lens 16 and condensing lens 18. A plate of ground glass 15 is positioned in the Fraunhofer plane between the two diffractometers. A light source 11 is positioned in plane A and a plate of ground glass 15 is positioned in plane C. The distance from plane A to lens 12 is equal to the focal length of lens 12; the distance from lens 14 to plane C is equal to the focal length of lens 14; the distance from plane C to lens 16 is equal to the focal length of lens 16, and the distance from lens 18 to plane E is equal to the focal length of lens 18. The distance between lenses 12 and 14 and the distance between lenses 16 and 18 is irrelevant to the present invention so long as lenses 12 and 14 are on opposite sides of plane B and lenses 16 and 18 are on opposite sides of plane D.

An unknown character is located on film 13. This unknown character is formed by transparent lines in an otherwise opaque mask. In the example shown in FIGURE 1, the character located on film 13 merely consists of a series of straight lines having equal spacing across the film. The reason that this particular character or pattern is chosen for the first example will become apparent later.

Film 17 also has transparent and opaque areas. In the example shown in FIGURE 1, the transparent areas consists of a series of lines having the same spacing as the lines on mask 13. The following explanation will show how the present invention recognizes the fact that the character (or mask) in plane B is identical to the character (or mask) in plane D.

The system operates as follows: The monochromatic light generated by source 11 is collimated by lens 12. A portion of this collimated light then passes through film 13 and is focused by lens 14 forming a diffraction pattern on the face of the ground glass 15. The pattern formed in plane C is generally termed a Fraunhofer pattern. In the example shown in FIGURE 1, due to the simplicity of mask 13, the image formed on the ground glass 15 consists of a series of dots designated 61, 62 and 63. One can analytically determine what pattern will appear in plane C by taking the Fourier transformation of the character on film 13.

The Fourier transformation of the particular pattern shown on film 13 in FIGURE 1 consists of a series of dots. The various dots correspond to different orders of diffraction. It can be shown mathematically that since the areas in film 13 change abruptly from transparent to opaque and vice versa, only odd orders of diffraction produce dots in plane C. The intensity of the dots located further from the center is less than the intensity of the dots closer to the center. If the magnitude of the intensity of the dot in plane C produced by the zero order diffraction taken as 1 the intensity of the dot produced by first order diffraction is $(2/\pi)^2$, the intensity of the dot produced by third order diffraction is $(2/3\pi)^2$, the intensity of the dot produced by fifth order diffraction is $(2/5\pi)^2$, etc. For our purposes, it is only necessary to consider the dot produced by zero order diffraction and the dots produced by first order diffraction. Hence, only the dots produced by the zero order diffraction and by the first order diffraction are shown in FIGURE 1.

It is important to note that each dot in plane C has light which came from each transparent area in film 13. Naturally, the path length to each of the dots in plane C is not the same from each of the transparent areas in film 13. Hence, relative to each dot in plane C, the light from different transparent areas of film 13 has a different phase angle. If no ground glass were located in plane C and a screen were placed in plane D, the light would pass through plane C and form an image of film 13 in plane D. Thus, the light in these dots contains information relative to the characteristics of the character on film 13. Furthermore, the light from a single one of the dots 61, 62 or 63 (if ground glass 15 were removed) could recreate an image of the entire character on film 13. For example, light arrives at point 61 from both points 67 and 68 in mask 13. However, the light arriving at point 61 from point 68 travels a longer distance than does the light arriving at point 61 from point 67. That is, there is a larger number of wave lengths between point 68 and point 61 than between point 67 and point 61. Stated differently, the information relative to the particular area of film 13 through which the light passed is contained in the light at point 61 by the phase angle of the light. Stated still differently, the light from different transparent areas of film 13 when it arrives at a dot in plane C carries information relative to the area of film 13 through which it passed in its phase angle.

With the present invention the ground glass 15 located in plane C destroys the phase information in the light. The reason for this is that a ground glass plate has a highly irregular surface which randomizes the phase of light passing through the glass. Thus, with ground glass 15 in the system, each of the dots in plane C appears as an individual point light source and the light from these dots, after passing through the ground glass 15, can no longer create an image of mask 13. However, as will be seen later, ground glass 15 adds to the utility of the system rather than detracting therefrom.

Figures 1A, 1B, 1C, 1D:
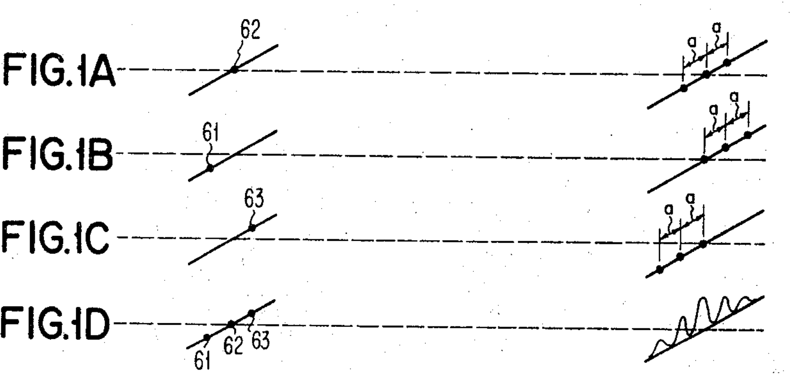
FIGURES 1A to 1D are diagrams which are used to explain the operation of the system shown in FIGURE 1.

Relative to film 17, the light from each of the points 61, 62 and 63 acts in a manner similar to the manner that the light from point 11 acted relative to film 13. That is, each of the points 61, 62 and 63 creates a diffraction pattern in plane E. Again, due to the simplicity of the character on film 17, the diffraction pattern in plane E, due to each of dots 61, 62 and 63, merely consists of three dots. The diffraction pattern created by each of the points 61, 62 and 63 is shown in FIGURES 1A, 1B and 1C. As shown in FIGURE 1A, light from point 62 creates a diffraction pattern which is centered about the optical axis OA. FIGURE 1B shows that the light from point 61 forms three dots, the center of which is located to the right hand side of the optical axis OA, and FIGURE 1C shows that the light from point 63 creates three dots, the center of which is located to the left hand side of the optical axis.

The separation between the dots or points in a diffraction pattern is determined by the frequency of the light and by the spatial characteristics of the mask which created the particular diffraction. The dots 61, 62 and 63 in plane C have a particular spacing due to the fact that the light from source 11 is monochromatic and the lines on mask 13 had a particular spacing. Since mask 70 has the same spacing as does mask 30, the dots in the diffraction pattern in plane E due to each of the light sources 61, 62 and 63, have the same separation as do the sources 61, 62 and 63 in plane 15. Stated differently, due to the frequency of the light and the spacing of the lines on film 13, dots 61, 62 and 63 are separated from each other by a certain distance herein designated by the letter *a*. Since the lines on film 17 have the same spacing as do the lines on film 13, the three dots formed in plane C due to the light from dot 61 are also separated by *a* units (FIGURE 1B); the three dots formed by the light from dot 62 are also separated by *a* units (FIGURE 1A), and the three dots formed by light from dot 63 are also separated by *a* units (FIGURE 1C).

Thus, on screen 19 where the patterns due to the light from each of the dots 61, 62 and 63 actually appear, the light from the three patterns is to a large extent superimposed thereby only creating an array of five dots rather than an array of nine dots. The center dot (designated 64) will consist of three superimposed dots, the first side dots (designated 65) will consist of two superimposed dots and the outside dots (designated 66) will consist of only one dot. As a result of this, the intensity of dot 64 is greater than the intensity of dot 65 and the intensity of dot 65 is greater than the intensity of dot 66. This is shown in FIGURE 1D. This particular pattern which appears on screen 19 indicates that the patterns or characters on films 13 and 17 are identical. The term "autocorrelation" is generally applied to the recognition that two characters are identical.

Figure 2:
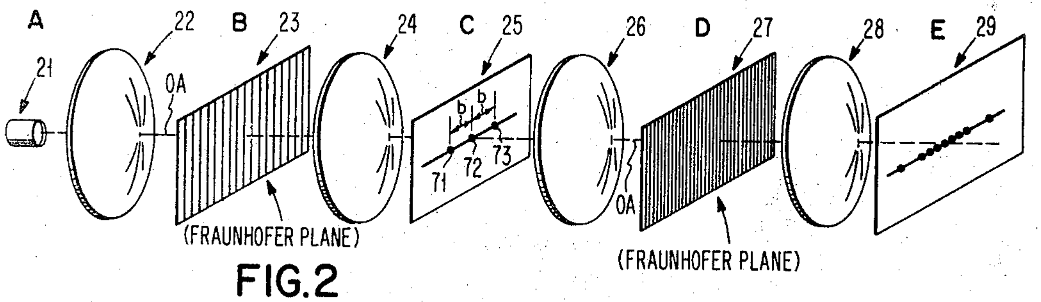
FIGURE 2 shows the first embodiment of the present invention being used to generate a cross correlation pattern.

The pattern produced on screen 19, when two dissimilar characters are located on films 13 and 17, is shown in FIGURE 2. FIGURE 2 shows a system which includes two diffractometers which are identical to the two diffractometers shown in FIGURE 1. The difference between the systems shown in FIGURES 1 and 2 is that the characters on the two film strips in the two diffractometers are not identical as they were in the system shown in FIGURE 1.

For ease in reference between the drawings and specifications and to show the correspondence between the various systems, the last digit in the numeral used to designate each component in FIGURE 2 is the same as the last digit used to designate the corresponding component in FIGURE 1. However, in FIGURE 1, the first digit of each numeral used to designate a component was the numeral 1 whereas in FIGURE 2, the first digit of each numeral used to designate a component is the numeral 2. Since the various lenses and planes shown in FIGURE 2 are identical to the corresponding planes in FIGURE 1, and since the operation of the system shown in FIGURE 2 is, in principle, similar to the operation of the system shown in FIGURE 1, no explanation thereof will be given. The only explanation which will be given is an explanation of the image which appears on screen 29 due to the fact that the character on film 23 is different from the character on film 27.

The character on film 23 consists of a series of opaque lines. This character forms a diffraction pattern on ground glass 25 which consists of three dots which are designated 71, 72 and 73. Due to the frequency of the light and the particular spacing of the lines on film 23, dots 71, 72 and 73 have a particular spacing designated by the letter *b*. The ground glass 25 destroys the phase information in the light at plane C and therefore, the three dots 71, 72 and 73 form three point sources which, in turn, create images on screen 29 as in the first embodiment.

Figures 2A, 2B, 2C, 2D:
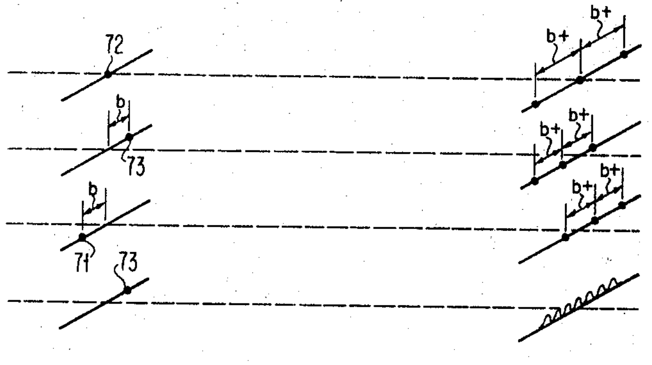
FIGURES 2A to 2D are diagrams which are used to explain the operation of the system shown in FIGURE 2.

FIGURES 2A, 2B and 2C show the pattern produced on screen 29 due to each of the dots 71, 72 and 73. FIGURE 2A shows the pattern produced by the light from dot 72. Due to the fact that the spacing of the lines on film 27 is closer together than is the spacing of the lines on film 23, the dots on screen 29 due to the light from point 72, are spaced further apart than *b* units. The distance between the dots due to the light from point 72 is designated herein as *b*+ unit. This is shown in FIGURE 2A. FIGURE 2B shows the pattern created on screen 29 due to the light from dot 73. The light from dot 73 creates an image on screen 29 which consists of three dots. These dots are separated by *b*+ units as shown in FIGURE 2B. However, since dot 73 is located *b* units from the optical axis, and since the deviation of the light due to the character on film 27 is *b*+ units, the center dot of the pattern formed by the light from dot 73 is not on the optical axis. This is again shown in FIGURE 2B.

FIGURE 2C shows the pattern formed by the light from dot 71, Again, dot 71 forms a pattern of three dots, each of which are separated by *b*+ units. Since dot 71 is *b* units from the optical axis and since the light is deviated by *b*+ units, the center dot of the pattern formed by the light from dot 71 does not fall on the optical axis.

The patterns formed by the light from dots 71, 72 and 73 are all superimposed on screen 29. Due to the fact that none of the dots in the patterns formed by the light from dots 71 and 73 are on the optical axis (FIGURES 2B and 2C) the dots in the various patterns are not superimposed on screen 29 and thus, nine individual dots appear on screen 29.

Thus, FIGURE 1 shows that if the characters on the film strips in planes B and D are identical, the image appearing in plane E has a peak amplitude at one particular point. FIGURE 2, on the other hand, shows that if the characters on the film in planes B and D are different, the image appearing in plane E has a more uniform intensity. This principle can be used to detect the similarity or difference between characters located on films 13 and 17. The characters used in the embodiments thus far discussed have been very simple. The following explanation will show how the invention can be used to recognize more complex characters.

Figure 3:
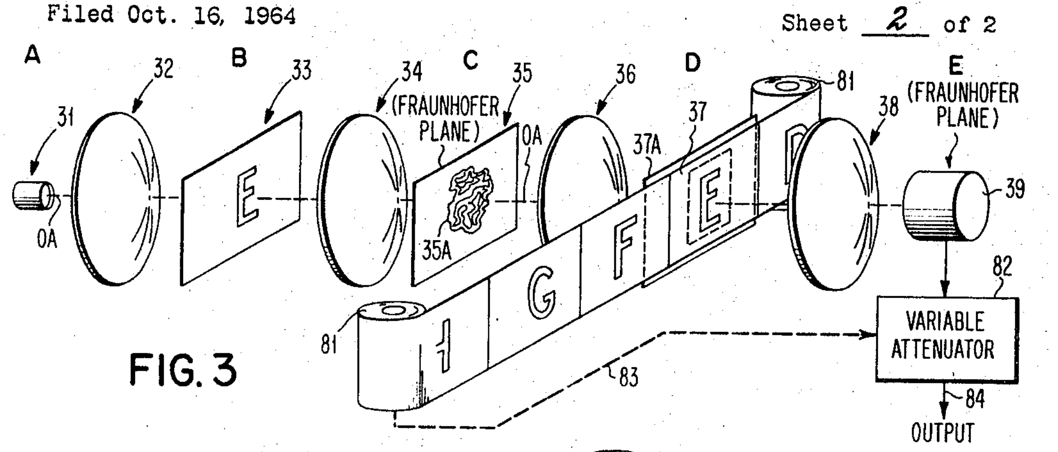
FIGURE 3 shows a second embodiment of the present invention.

A second embodiment of the invention is shown in FIGURE 3. The second embodiment of the invention includes two diffractometers which are identical to the two diffractometers in the first embodiment of the invention. The only difference between the second embodiment of the invention and the first embodiment of the invention is that the screen in plane E has been replaced by a photodetector 39, reels 81 have been provided to facilitate changing the characters in plane D and a variable attenuator 82 is provided. Again, to show the correspondence between the components in the second embodiment of the invention and the components shown in FIGURES 1 and 2, each component has been designated by a two digit number. The low order digit of the number is the same as the low order digit of the number used to designate the corresponding component in FIGURES 1 and 2.

The characters on films 33 and 37 are more complicated characters than the character shown in FIGURES 1 and 2. As shown in FIGURE 3, the character on film 33 is the letter "E." This letter (as are the characters on film 37) is formed by transparent areas in an opaque background. Film 37 is extended and it has a plurality of characters thereon. A mechanical device 81 (not shown in detail) is provided for sequentially moving the various characters on film 37 into the optical system. The size of lens 36 and a mask 37A insures that only one character on film 37 is illuminated at any one time.

The diffraction pattern created by the letter "E" is not merely a series of dots. The diffraction pattern created in plane B by the first diffractometer when the letter E (or any other relatively complex character) is in plane B is a relatively large area of irregular shape indicated by the area 35A. The different points in area 35A have different intensities of illumination. Since the entire diffraction pattern 35A serves as a light source for the second diffractometer, the second diffraction creates an image in plane E which can be considered to consist of a continuum of superimposed patterns. For reasons previously explained relative to FIGURES 1 and 2, the significant information relative to whether the characters on films 33 and 37 are the same is contained in the portion of the pattern near the optical axis. Thus, the magnitude of the output of photodetector 39, which is on the optical axis, indicates whether or not the two characters are similar.

One factor which must be taken into account when comparing the magnitude of the output of photodetector 39, due to different known characters in plane D is that magnitude of the signal generated by detector 39 is to some extent determined by the total transparent area in the particular character positioned in plane D. Thus, there are two factors which determine the magnitude of the signal generated by detector 39. The first factor is whether or not the character in plane D is the same as the character in plane B. The second factor is the amount of transparent area in the character located in plane D. This is a typical problem encountered in character recognition systems. This difficulty can be overcome by normalization.

Normalization of the signals generated by photodetector 39, due to different characters, can be achieved by attenuating each signal generated by photodetector 39 by an amount dependent upon the amount of transparent area in the particular known character positioned in plane D when the signal is generated. This is conventionally termed normalization according to the Schwartz inequality. A variable attenuator 82 is provided in order to attenuate the signals generated by detector 39. The amount of attenuation is controlled by mechanical input 83 which is in turn connected to drive 81 so that the amount of attenuation produced by attenuator 83 is determined by the particular character in the optical system at any time. Variable attenuator 82 could merely be a variable resistor. The details of mechanical connection 83 are not shown since such devices are conventional. Alternately, instead of providing variable attenuator 82, the transparency of the characters in plane D can be normalized by superimposing on each known character a semi-transparent mask. The degree of transparency of the semi-transparent masks superimposed on each known character is determined by the amount of transparent area in the associated character. The degree of transparency of each semi-transparent mask must be chosen so that with a particular amount of illumination, the same amount of light will pass through each of the known characters.

The system shown in FIGURE 3 can be operated as follows: A film strip with an unknown character thereon is first placed in plane B. Thereafter, the various characters on film 37 are sequentially moved into the optical system. During this time, the output of attenuator 82 is observed. When the character on film 37 corresponds to the unknown character, a relatively large signal appears on the output of attenuator 82. If a series of known characters are placed in plane D and the output of attenuator 82 is observed, the known character which produces the largest output corresponds to the unknown character.

Two important points relative to the embodiment of the invention shown in FIGURE 3 are: First, film strips 33 and 37 only contain two types of areas; that is, transparent areas and opaque areas. There are no gray tones in either film 33 or 37. Second, there is no need to align the known and unknown characters so long as both are within the optical system. Stated differently, the system is shift invariant.

Figure 4:
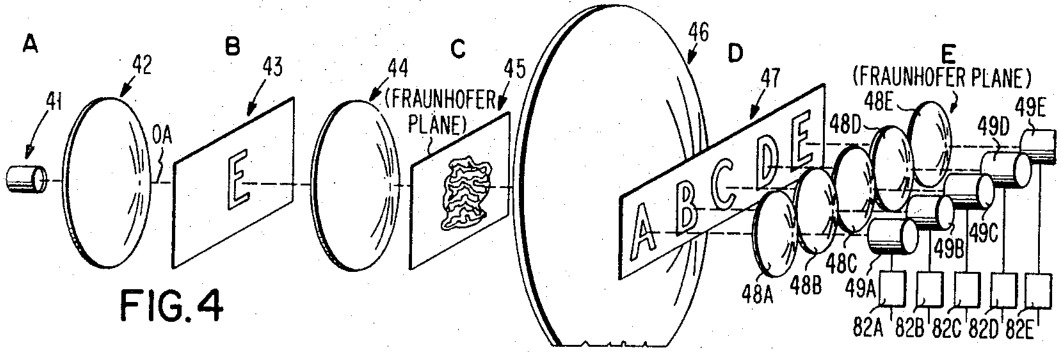
FIGURE 4 shows a third embodiment of the present invention.

A third embodiment of the invention is shown in FIGURE 4. Again, the last digit of the numeral used to designate each of the components corresponds to the last digit used to designate corresponding components in the previous embodiments.

The difference between the third embodiment and the previous embodiment is that each of the previous embodiments included only two diffractometers. The third embodiment includes a first diffractometer which is similar to the first diffractometer in the previous embodiments; however, in the embodiment of the invention shown in FIGURE 4, the output of the first diffraction goes to a plurality of diffractometers.

The second diffractometer shown in the previous embodiments is replaced by a plurality of second diffractometers by replacing lens 38 by a series of lenses which are designated 48A, 48B, 48C, 48D and 48E. Each of the lenses 48A to 48E has associated therewith a photodetector respectively designated 49A to 49E and each photodetector has an associated attenuator 82A to 82E. Another difference between the embodiment shown in FIGURE 4 and previous embodiments is that film strip 47 has a plurality of characters thereon, all of which are within the optical system at the same time. Lens 46 is large enough to illuminate the entire area occupied by film 47. As in the previous embodiment, the distance from plane C to lens 46 is equal to the focal length of lens 46. Each of the lenses 48A to 48E collects the light that passes through a particular one of the characters on film strip 47, and it forms a separate diffraction pattern. Thus, each of the lenses 48 and the associated film 47 essentially constitute a separate diffractometer which has its own sub-optical axis.

The intensity of the light reaching the various photodetectors 49A to 49E indicates whether the unknown character on the associated portion of film strip 47 corresponds to the associated character on film strip 43. As previously explained, the output of the various photodetectors must be normalized before being compared. In the embodiment shown in FIGURE 4 each photodetector is associated with a particular known character; hence, attenuators 82A to 82E can merely consist of potential dividers which are adjusted according to the amount of transparent area in the associated character.

It should be understood that, as previously explained, the system is invariant relative to shifts in the character in D plane. Thus, it is irrelevant that the various characters on film strip 47 have different physical positions.

Herein, for ease in illustration, only five characters have been shown on film strip 47 and likewise only five lenses 48 and five photodetectors 49 have been shown; however, it should be understood that this naturally could be expanded to any required number.

Figures 5, 5A, 5B, 5C, 5D:
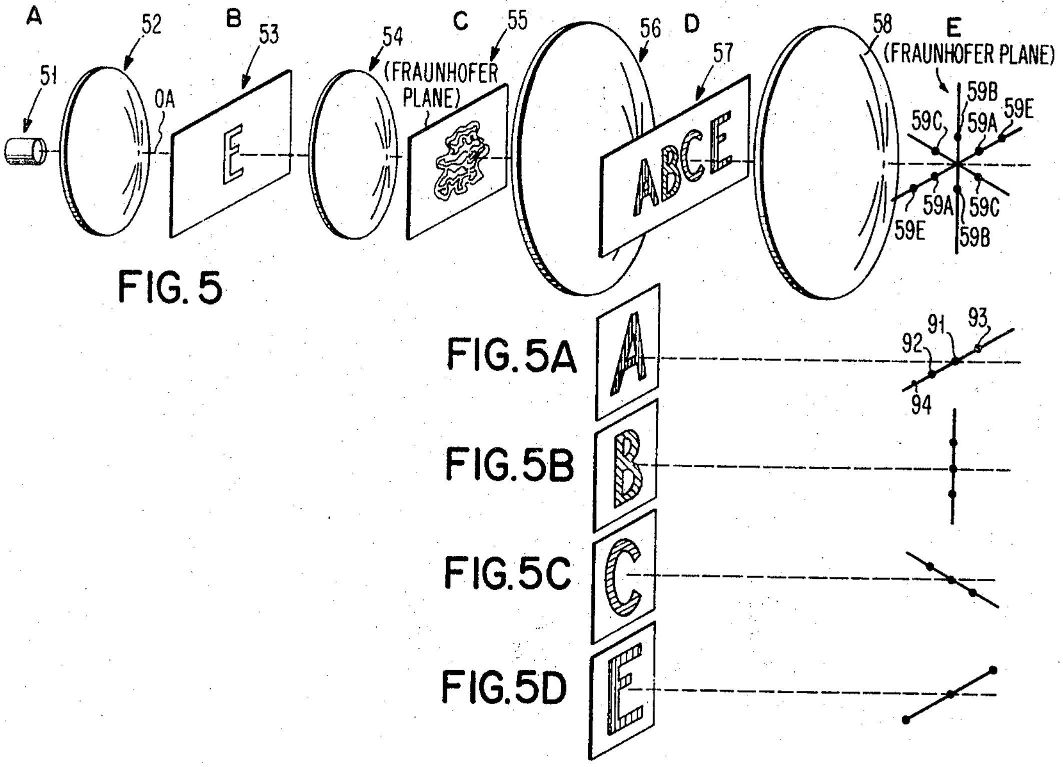
FIGURE 5 shows a fourth embodiment of the present invention.
FIGURES 5A to 5D are diagrams which are used to explain the operation of the system shown in FIGURE 5.

A fourth embodiment of the invention is shown in FIGURE 5. In order to show the correspondence between the various components in the fourth embodiment and the various components in the previously described embodiments, the last digit of the numerals used to identify each component in the fourth embodiment corresponds to the last digit used to identify corresponding components in the previous embodiments.

The fourth embodiment only includes two diffractometers; however, similar to the third embodiment, it is capable of simultaneously correlating the unknown character with a plurality of known characters. As with the third embodiment shown in FIGURE 4, the film strip 57 has a plurality of characters thereon, all of which are within the optical system at the same time. However, the characters on film strip 57 do not merely consist of transparent lines as in the previous embodiments. Each character has superimposed thereon a high order diffraction grating. That is, each character is crosshatched with opaque lines. In the first three characters A, B and C, the lines have the same spacing but different orientation. In the fourth character, the lines have a different spacing.

The operation of the system shown in FIGURE 5 is most easily understood by considering separately the effects produced in plane E by each of the characters on film 57. Later, the combined effects of all the characters will be considered.

The effects produced by the light from the area of film 57 which has the letter A thereon is shown in FIGURE 5A. If no high frequency diffraction grating were superimposed upon the letter A, it would form one composite diffraction pattern in plane E (hereinafter termed a diffraction image) and that diffraction image would be centered about the optical axis. As in the embodiment of the invention shown in FIGURE 3, the intensity of the light at the center of the diffraction image would indicate whether there was an autocorrelation or a cross correlation with the unknown letter in plane B. With a high frequency diffraction grating superimposed on the letter A, a plurality of diffraction images are formed in plane E. The zero order diffraction by the high frequency grating forms a diffraction image 91 which is centered on the optical axis and first order diffraction by the high frequency grating forms two diffraction images 92 and 93 which are off the optical axis. The shape and relative light intensities in each diffraction image are identical to the shape and relative light intensities in the one diffraction image which would be formed if no high frequency grating were superimposed on the letter. For reasons previously explained, the intensity of the light at the center of a diffraction image or pattern indicates whether the pattern represents a cross correlation or an autocorrelation pattern.

The three patterns 91, 92 and 93 are located along a radial line 94. The orientation of line 94 is perpendicular to the orientation of the lines in the high frequency diffraction grating which is superimposed upon the letter A. If the diffraction grating superimposed on the letter A had higher order effects (above the second order) then other patterns or images would also appear farther out along the line 94.

FIGURE 5B shows that the portion of film strip 57 having the letter B thereon also forms a series of diffraction images in plane E due to the diffraction grating which is superimposed upon the letter B. However, since the diffraction grating superimposed on the letter B has a different orientation than the diffraction grating superimposed on the letter A, the orientation of the radial line along which these diffraction images appear is different from the letter B than for the letter C. FIGURE 5C shows the diffraction images created by the portion of film 57 which has the letter C thereon. Again, due to the diffraction pattern superimposed on the letter C, a plurality of diffraction images are formed in plane E along a particular radial line. Since the orientation of the diffraction grating superimposed on the letter C is different from the orientation of the diffraction gratings superimposed on the letters A and B, the orientation of the radial line along which the diffraction images due to the letter C appear is different than the orientation of the line along which the diffraction images due to the letters A and B appear.

Since the spacing between the lines in the diffraction gratings which are superimposed upon the letters A, B and C is the same, the spacing of the diffraction images formed in plane E due to each of the letters A, B and C is the same. The diffraction grating superimposed upon the letter E has a different frequency or spacing than the diffraction gratings superimposed upon the letters A, B and C; thus, as shown in FIGURE 5D, the portion of film strip 57 which has the letter E thereon also forms three diffraction images in plane E. However, the diffraction images due to first order diffraction are spaced further from the optical axis due to the frequency of the diffraction pattern superimposed on the letter E.

It is noted that FIGURES 5A, 5B, 5C and 5D each only shown the effects of the zero order diffraction and the first order diffraction due to the high frequency gratings. If the grating superimposed upon letters on film 57 have higher order diffraction effects, patterns spaced further from the optical axis would also be generated. For the reasons previously explained with regard to the other embodiments of the invention, one can detect whether the image appearing in plane E represents an autocorrelation pattern or a cross correlation pattern by detecting the intensity of the light at the center of the image. Stated differently, one can detect whether the letter located on film 53 is the same as any one of the letters located on film strip 57 by detecting the intensity of the light at the center of one of the diffraction images created by each of the letters.

The diffraction images created by the four letters on film 57 all appear in plane E, and since the zero order diffraction pattern for each letter is centered on the optical axis, the diffraction pattern cannot be used to differentiate between the patterns formed by the various letters. However, due to the different orientation and spacing in the diffraction gratings which are superimposed upon the various letters, the first order diffraction images created by the various letters appear in separate areas of plane E. Photodetectors 59A to 59E are positioned at the center of the area where the various diffraction images appear. The photodetectors 59A to 59E can detect the intensity of the light at the center of the various diffraction images and thereby determine whether the various patterns are cross correlation patterns or autocorrelation patterns. Each of the photodetectors 59A to 59E must have an attenuator associated therewith (similar to attenuators 82A to 82E in FIGURE 4) for normalization. For convenience of illustration, the attenuators are not shown in FIGURE 5.

The frequency and orientation of the diffraction grating superimposed upon the various letters on film 57 should be chosen so that diffraction patterns are sufficiently separated in plane E so that there is no overlapping, at least in the central portion of the patterns where the various photodetectors are located. Furthermore, the characteristics of the high frequency gratings superimposed on the various letters on film 57 should be chosen so that the first order diffraction predominates. In this way, light will not be lost in the zero order and higher order diffraction images.

Various refinements of the system are possible in order to achieve better discriminations. For example, the discrimination can be enhanced by placing a small opaque object at the optical axis in plane C. The effect of such an object can be seen by reference to FIGURES 1 and 2. A small opaque object on the optical axis blocks the light in dot 62 (FIGURE 1) or 72 (FIGURE 2). Thus, the light reaching plane E would only consist of the patterns shown in FIGURES 1B and 1C or in FIGURES 2B and 2C. It is noted that the light from dots 62 and 72 always falls on the optical axis in plane E irrespective of whether the characters in planes B and D are similar or dissimilar. Thus, the light from dots 62 and 72 does not aid in discrimination and by eliminating the light from dots 62 and 72, the discrimination is enhanced.

The films 13 and 37, etc., can be any of the known types of films which have transparent and opaque areas such as silver haloid and diazo films or they can be films which produce the visible images by scattering light such as the vesicular image type of film. Likewise, characters recorded as deformation patterns (e.g., characters on thermoplastic film) can be used.

As shown herein, each of the film strips positioned in planes B and D have transparent and opaque areas. This allowed all of the components in the system to be positioned along one straight optical axis. Naturally, it should be understood that instead of having transparent and opaque areas, these film strips or records could have areas which are either reflective or nonreflective. With such records, the principles of the present invention could be utilized with the exception that the optical axis would not be straight, but would bend at each of the records.

As shown herein, the unknown character has always been placed in plane B and the known character in plane D. It should be understood that this has been merely for consistency between the various embodiments of the invention and the position of the known and unknown characters could be reversed.

As shown in each embodiment described herein, the point source of light in plane A is monochromattic. In all embodiments which have detectors positioned to detect the intensity of the light in the zero order diffraction pattern (i.e, the systems shown in FIGURES 1, 2, 3 and 4) the point light source in plane A could be a polychromatic source, since irrespective of the frequency of the light, the zero order diffraction pattern is located at the same place. In the embodiment of the invention shown in FIGURE 5, it is desirable to use a monochromatic light source, since in the embodiment shown in FIGURE 5, the detectors in plane E are positioned to detect light in the first order diffraction patterns and the position of a first order diffraction pattern depends on the frequency of the light.

As used in the appended claims, the terms transparent and opaque refer to whether or not light is transmitted along the optical axis past a particular object and hence, as used herein, these terms apply equally well to reflective and nonreflective objects.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. An optical character recognition system comprising:
a first optical means for forming a Fraunhofer diffraction pattern of a first character;
means for randomizing the phase of the light of said diffraction pattern, said randomizing means being positioned at the diffraction pattern;
means for collimating the light from said randomizing means and directing the light to a second character;
second optical means for forming a Fraunhofer diffraction pattern of the light received from said second character; and
means for detecting the intensity of the light at the center of the diffraction pattern formed by said second optical means;
whereby the similarity or dissimilarity between said second characters can be detected.

2. An optical character recognition system comprising:
a first optical means for forming a Fraunhofer diffraction pattern of an unknown character;
means for randomizing the phase of the light of said diffraction pattern, said randomizing means being positioned at the diffraction pattern;
means for collimating the light from said randomizing means and directing the light to a plurality of second characters, each second character being different;
a plurality of second optical means, each second optical means forming a Fraunhofer diffraction pattern of the light received from one of said different second characters; and
detecting means for detecting the intensity of the light as the center of the diffraction pattern formed by each of said second optical means;
whereby said detecting means indicates the particular second character which is the same as said unknown character.

3. An optical character recognition system comprising:
a first optical means for forming a Fraunhofer diffraction pattern of a first character;
means for randomizing the phase of the light of said diffraction pattern, said randomizing means being positioned at the diffraction pattern;
means for collimating the light from said randomizing means and directing the light to a plurality of second characters, each second character being different;
a high frequency diffraction gating superimposed on each of said second characters, said diffraction grating being different for each of said second characters;
second optical means for forming a Fraunhofer diffraction pattern of the light received from said plurality of second characters having diffraction gratings superimposed thereon; and
a plurality of detecting means, equal in number to the number of different gratings, each detecting means located at the center of one of the first or higher order diffraction spots generated from a different one of the gratings, for detecting the intensity of the light at the center of said spot;
whereby the similarity or dissimilarity between said first character and each of said second characters can be detected.

4. The device recited in claim 1 wherein said means for randomizing the phase of the light comprises a plate of ground glass.

5. The device recited in claim 2 wherein said means for randomizing the phase of the light comprises a plate of ground glass.

6. The device recited in claim 3 wherein said means for randomizing the phase of the light comprises a plate of ground glass.

7. An optical character recognition system comprising:
first, second, third and fourth lenses positioned along an optical axis;
a light source positioned on said optical axis at the front focal plane of said first lens;
each lens being spaced from the preceding lens by the sum of the focal lengths of said lens and the preceding lens so that the light between said first and second lenses is collimated and the light between said third and fourth lenses is collimated;
a plate of ground glass positioned in the Fraunhofer plane between said second and third lenses for randomizing the phase of the light passing through said plane;
a record having a first optically visible character thereon positioned between said first and second lenses whereby a diffraction pattern representative of said character is generated in said Fraunhofer plane; and
an identification mask having a second optically visible character thereon positioned between said third and fourth lenses;
whereby a diffraction pattern is generated in the Fraunhofer plane beyond said fourth lens, which indicates whether said first character is the same as said second character.

8. An optical character recognition system comprising:
first, second, third and fourth lenses positioned along an optical axis;
a point light source positioned on said optical axis at the front focal point of said first lens;
each lens being spaced from the preceding lens by the sum of the focal lengths of said lens and the preceding lens so that the light between said first and second lenses is collimated and the light between said third and fourth lenses is collimated;
a plate of ground glass positioned in the Fraunhofer plane between said second and third lenses;
a record having a first optically visible character thereon positioned between said first and second lenses whereby a diffraction pattern representative of said character is generated on said plane of ground glass; and
an identification mask having a plurality of second optically visible characters thereon positioned between said third and fourth lenses, each second character being different; and
a high frequency diffraction grating superimposed on each of said second characters, said diffraction grating being different for each of said second characters;
whereby a plurality of diffraction patterns are generated in the Fraunhofer plane beyond said fourth lens for each second character, each of said diffraction patterns being physically separated, the intensity of light at the center of each character indicating whether said first character is the same as the associated second character.

References Cited

UNITED STATES PATENTS 3,196,392 7/1965 Horwitz et al. ------ 340—146.3

DAVID SCHONBERG, *Primary Examiner.*

R. J. STERN, *Assistant Examiner.*

U.S. Cl. X.R.

340—146.3; 350—162; 356—71

U.S. DEPARTMENT OF COMMERCE

PATENT OFFICE

Washington, D.C. 20231

UNITED STATES PATENT OFFICE

CERTIFICATE OF CORRECTION

Patent No. 3,437,824 April 8, 1

Adolf W. Lohmann

It is certified that error appears in the above identified patent and that said Letters Patent are hereby corrected as shown below:

Column 11, line 17, before "second" insert -- first and --; line 32, "as" should read -- at --; line 46, "gating" should read -- grating --.

Signed and sealed this 7th day of October 1969.

(SEAL)
Attest:

Edward M. Fletcher, Jr.
Attesting Officer

WILLIAM E. SCHUYLER, .
Commissioner of Pate